May 20, 1947.  C. J. CRANE  2,420,656
EFFICIENCY MEASURING DEVICE
Filed Feb. 14, 1944
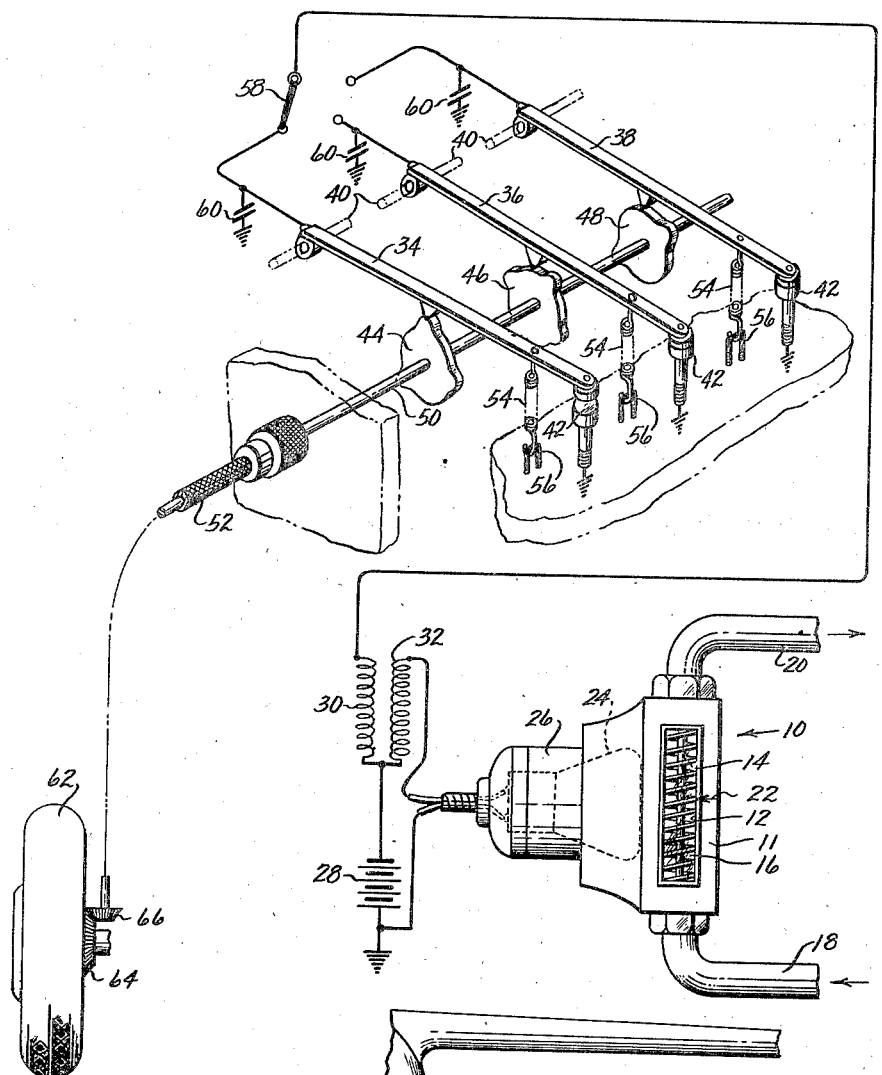
INVENTOR
CARL J. CRANE
BY Joseph Ch. Hazell
and Clade Koontz
ATTORNEYS Patented May 20, 1947

2,420,656

UNITED STATES PATENT OFFICE 2,420,656

EFFICIENCY MEASURING DEVICE

Carl J. Crane, Sacramento, Calif.

Application February 14, 1944, Serial No. 522,829

8 Claims. (Cl. 73—114)

(Granted under the act of March 3, 1883, as amended April 30, 1928; 370 O. G. 757)

The invention described herein may be manufactured and used by or for the Government for governmental purposes, without payment to me of any royalty thereon.

The present invention relates to a device for measuring the operating efficiency of an automotive vehicle and, more particularly, to a stroboscopic type of miles-per-gallon gage.

It is generally desirable to provide the operator of an automotive vehicle with some type of visual indicator for showing the efficiency at which the vehicle is operating. With this knowledge he can determine whether or not the vehicle is in need of attention long before any actual stoppage occurs. It also enables him to determine the cost of operation of the vehicle insofar as fuel consumption is concerned.

With a view to providing a simple and inexpensive miles-per-gallon indicator, the present invention contemplates the use of a stroboscope for intermittently illuminating the impeller of a fuel flow meter connected in the fuel line of the vehicle. The lamp of the stroboscope is flashed on and off by means of an interrupter driven from the engine, speedometer shaft or other suitable source of motion on the vehicle. Since the rate of fuel consumption is not generally a linear function of the speed of the engine, speedometer shaft, etc., it is necessary to select some particular speed of the engine, speedometer shaft, etc., and to design the interrupter for the normal fuel consumption of the engine at the speed. That is, the interrupter must be so constructed and arranged as to cause the lamp to flash on and off at such a frequency as to cause the impeller to appear stationary when an average or normal amount of fuel is flowing through the fuel line of the vehicle. It is, of course, possible to design the device for operation at several different speeds of the engine, speedometer, shaft, etc. This may be done by providing a separate interrupter or breaker mechanism for each of the different speeds at which it is desired to secure an indication of the operating efficiency of the vehicle. Then by providing a means whereby each of the separate breaker mechanisms may be individually selected for operation, the device may be caused to indicate the efficiency of the vehicle at any one of the particular speeds. Hence, a simple but effective instrument is provided for indicating at a glance whether the vehicle is operating at normal efficiency or whether it is operating above or below normal efficiency.

It is accordingly one of the objects of the present invention to provide a novel type of efficiency indicator for automotive vehicles based upon the principle of a stroboscope.

Another object of the invention is to provide a stroboscopic type of efficiency indicator for automotive vehicles which will show at a glance whether the vehicle is operating at normal efficiency or whether it is operating above or below normal efficiency.

A further object of the invention lies in the provision of a stroboscopic device for indicating whether an automotive vehicle operating at a certain speed is performing with normal efficiency and, if not, whether the efficiency is above or below normal and by what amount it is above or below this criterion.

Still a further object of my device resides in the provision of a stroboscopic device for indicating whether an automotive vehicle operating at any one of the several predetermined speeds is performing with normal, better than normal or less than normal efficiency.

A preferred embodiment of the present invention will be hereinafter described with reference to the accompanying drawings, given merely by way of example, in which:

Figure 1 is a schematic view of the invention as applied to an automobile or other land vehicle.

Figure 2 is a fragmentary view of an airplane engine showing the power take-off for driving the breaker mechanism.

Figure 3 is a fragmentary view of an aircraft showing an impeller type of airspeed indicator for driving the breaker mechanism.

As shown in Figure 1, the invention consists of a viewing or indicating unit 10 which includes a housing 11, preferably constructed of aluminum or other light metal, and which is provided with a vertically disposed bore 12 within which is rotatably mounted a helix 14. A window 16 is provided in the housing 11 in order that the impeller 14 may be viewed therethrough by the operator of the vehicle. Fuel from the gasoline tank is led into the bottom of the housing 11 by means of a conduit 18 after which it passes up through the bore 12 and into the conduit 20 attached to the top of the housing 11 after which it is led to the engine of the vehicle through the conduit 20. The particular type of impeller used is not important but this element is preferably constructed in the form of a helix having a pitch angle which is such as to enable the helix to be suitably rotated by the fuel flowing through the housing 11.

An index 22 is preferably provided on the face of the instrument so as to facilitate the observation of apparent upward or downward movement of the coils of the helix.

A neon glow lamp 24 is mounted in a receptacle 26 which is secured to the housing 11. The housing is so constructed as to enable light from the lamp 24 to illuminate the helix 14 which is immersed in the fuel passing through the bore 12. The lamp 24 is adapted to be intermittently energized by means of the electrical circuit shown in Figure 1. This circuit consists of a battery 28, one terminal of which is connected to the frame of the vehicle as indicated by the ground symbol in the figure. The other terminal of the battery is connected to one end of the primary and secondary coils 30 and 32, respectively, of a transformer. The current flowing from the battery through the primary coil 30 is adapted to be periodically interrupted by means of one of contactor arms 34, 36 or 38. One end of each of these arms is pivoted on a shaft 40 while the other end is provided with one element of a pair of contacts 42. The other element of each pair of contacts is secured to the framework of the vehicle as indicated in the drawing. The arms 34, 36 and 38 are adapted to be operated in a periodic fashion by means of the cams 44, 46 and 48 respectively, which are mounted in spaced relationship along a shaft 50 which is driven by means of a flexible cable 52. Each of the contact arms is yieldably urged downwardly by means of a spring 54 connected between the contact arms and an insulated anchoring member 56. As indicated in the drawing, the cam 44 is provided with three lobes so as to make and break the contact 42 three times for each revolution of the shaft 50. The cam 46 is shown provided with four lobes and the cam 48 with two lobes so that their respective arms 36 and 38 will be operated four times and two times, respectively, for each rotation of the shaft 50. Any one of the three contact arms may be rendered effective by means of the single-pole multiple-throw switch 58. Condensers 60 are provided between the contact arms and the frame of the vehicle in order to prevent arcing at the contacts 42. The upper end of the secondary coil 32 is connected to one terminal of the lamp 24 while the other terminal of the lamp is connected to ground. Hence, each time the primary circuit is broken by separation of the contacts 42 an inductive "kick" is applied to the lamp 24 through the secondary coil 32 so as to cause the lamp to be momentarily illuminated. Similarly, each time the circuit is made by means of the contacts 42, a voltage will be inducted in the secondary 32 to illuminate the lamp 24. Thus, the lamp will be illuminated twice for each of the lobes provided on the cams 44, 46 and 48. It is desirable that the secondary winding 32 of the transformer have a rather high D. C. resistance so as to limit the current through the glow lamp to a safe value although this same result might also be achieved by placing a current-limiting resistance in series with the lamp.

As shown in Figure 1 the flexible cable 52 is rotatably driven from a wheel 62 of an automotive type of land vehicle through the gears 64 and 66. It is, of course, possible to so select the gears 64 and 66 as to obtain the proper speed ratio between the wheel and the shaft 50 for causing the contact arm 34 to make and break the electrical circuit through the lamp 24 at the proper frequency to cause the helix 14 to appear stationary when a prescribed amount of fuel is flowing through the housing 11. If the operating efficiency of the vehicle is above normal the coils of the helix will appear to move downward whereas if the operating efficiency of the vehicle is below normal the coils will appear to move upward. In order to obtain this indication it is, of course, necessary that the vehicle be operated at a prescribed speed when the reading is taken. This, as mentioned earlier, is due to the fact that the rate of fuel flow is not a linear function of speed as is the rotation of the shaft 50. However, the divergence of the two functions is not rapid and consequently the speed of the vehicle is not critical. In other words, a small departure from the prescribed speed will not produce any noticeable effect upon the accuracy of the indication afforded by the instrument.

In order to enable readings to be taken from the instrument at more than one speed of operation of the vehicle, the additional contact arms 36 and 38 and their associated operating cams 46 and 48 are provided. By virtue of these additional arms, the operator may obtain an indication of the efficiency of the vehicle at three speeds rather than at one as would be the case if only the arm 34 and cam 44 were provided. Each of the cams 46 and 48 are provided with the proper number of lobes to cause the helix 14 to appear stationary when the vehicle is operating at the prescribed speed with normal efficiency. The cams 44, 46 and 48 shown in the drawings are, of course, intended to be merely illustrative of one form of the device and it is to be pointed out that these cams may be provided with as many lobes as may be necessary to suit the mechanism to a particular installation. It is also to be noted that the housing 11 is intended to be located in front of the operator of the vehicle so as to enable him to view the helix 14 through window 16. Hence, he can conveniently see at a glance whether or not his vehicle is operating with the proper efficiency. The selector switch 58 should also be placed within reach of the operator of the vehicle and the different positions of the switch should be marked in miles per hour in order that he may conveniently set the mechanism for operation at which ever one of the various speeds he chooses.

The present invention is not limited to use with land vehicles but may also be applied to aircraft in the manner indicated in Figures 2 and 3 of the drawings. As shown in Figure 2, the flexible shaft 52 is connected to a gear box 68 mounted on the frame of an airplane engine 70 so as to enable the shaft 50 to be driven at a speed proportional to that of the motor 70. The various contact arms 34, 36 and 38 may be selected by means of the switch 58 to accommodate the instrument to different engine speeds. If the airplane is equipped with a variable pitch propeller, the speed of the engine may be held within close limits by operation of the pitch governing mechanism. It will, of course, in this instance, be necessary to hold not only the speed of the engine constant but also that of the aircraft in order to obtain a true reading from the efficiency indicating instrument. This is due to the fact that the speed of the engine will at all times remain constant regardless of the throttle setting but the engine will consume different amounts of fuel at different throttle settings. This, of course, will be reflected in a change in air speed and it is therefore necessary to operate the craft at a predetermined air speed as well as at a predetermined engine speed.

As shown in Figure 3, the shaft 50 may alternatively be driven from an impeller type of air speed indicator 72 mounted in the slip stream outside of the aircraft fuselage. The flexible shaft 52 is driven from the air speed indicator 72 through a gear box 74 so as to obtain the desired speed ratio between the indicator 72 and the shaft 50. In this case, as in the case of the wheel 62 shown in Figure 1, it will be necessary to select one or more predetermined air speeds of the craft at which readings may be taken from the instrument 10 although, of course, the altitude of the aircraft would always be maintained within certain limits so as not to seriously affect the indication given by the instrument.

Having thus described my invention, what I claim as new and desire to secure by Letters Patent is:

1. An efficiency indicating device for a vehicle having a fuel consuming power source, a fuel reservoir means, and a conduit for conducting the fuel from said reservoir means to said power source, said device comprising an impeller rotatably mounted within said conduit so as to be rotated by the flow of fuel from said reservoir means to said power source, a window in said conduit through which said impeller may be viewed, a glow lamp adapted to illuminate said impeller, an electrical circuit for energizing said glow lamp, a make-and-break mechanism actuated by said power source for periodically interrupting said electrical circuit, and means for controlling the rate at which said make-and-break mechanism operates in accordance with the speed of operation of said vehicle.

2. The invention as defined in claim 1 wherein said make-and-break mechanism includes a shaft operated by the power source, means associated with said shaft and actuated thereby, arranged to provide for make-and-break operations at various selected time intervals, and selector switch means operable for including said shaft-actuated means so that the latter will function at the selected one of the various time intervals.

3. The invention as defined in claim 1 wherein said electrical circuit includes a source of electrical energy, and a transformer having a primary winding connected in series with said source of energy and said make-and-break mechanism, and a secondary winding across which said glow lamp is connected so as to be energized by the voltage induced therein each time the flow of current through the primary winding is disturbed by said make-and-break mechanism.

4. In an efficiency indicating device for an automotive land vehicle having at least one ground engaging wheel, a fuel consuming power source, reservoir means for containing the fuel consumed by said power source, and a conduit for conveying the fuel from said reservoir means to said power source, the combination of an impeller rotatably mounted within said conduit so as to be rotated by the fuel flowing through said conduit, a window in said conduit through which said impeller may be viewed, a glow lamp for illuminating said impeller, an electrical circuit for energizing said glow lamp, and a make-and-break mechanism operatively connected with said ground engaging wheel of said vehicle and with said electrical circuit so as to cause said circuit to be interrupted at a frequency proportional to the speed of rotation of said wheel.

5. In an efficiency indicating device for an aircraft having a fuel consuming power source, reservoir means for containing the fuel consumed by said power source, and a conduit for conveying the fuel from said reservoir means to said power source, the combination of an impeller rotatably mounted within said conduit so as to be rotated by fuel flowing therethrough, a window in said conduit through which said impeller may be viewed, a glow lamp for illuminating said impeller, an electrical circuit for energizing said glow lamp, and a make-and-break mechanism operatively connected with said power source and with said electrical circuit for interrupting said circuit at a frequency proportional to the speed of operation of said power source.

6. In an efficiency indicating device for an aircraft having a fuel consuming power source for propelling said aircraft, reservoir means for containing the fuel consumed by said power source, and a conduit for conveying the fuel from said reservoir means to said power source, the combination of an impeller rotatably supported within said conduit so as to be rotated by the fuel flowing therethrough, a window in said conduit through which said impeller may be viewed, a glow lamp for illuminating said impeller, an electrical circuit for energizing said glow lamp, an impeller type of air speed indicator located in the slip stream of said aircraft, and a make-and-break mechanism operatively connected with said air speed indicator and with said electrical circuit for interrupting said circuit at a frequency proportional to the speed of rotation of said indicator.

7. An efficiency indicating device for a vehicle, comprising a housing through which fuel flows to the power source of said vehicle, the housing having a window, an impeller in said housing adapted to be rotated by the fuel flowing through it to the power source of said vehicle, said impeller being visible through said window, an electric lamp for illuminating said impeller, an electric circuit for said lamp, and means responsive to the speed of said vehicle and actuated at a rate dependent on said speed while the vehicle is travelling normally at a constant speed, for periodically making and breaking the electrical circuit of said lamp.

8. An efficiency indicating device for a vehicle having propelling means and a fuel consuming power source for driving said means, said device comprising a housing through which fuel flows to the power source, a window on the housing, an impeller in said housing adapted to be rotated by the fuel flowing through it to the power source, the impeller being visible through the window, an electric lamp for illuminating said impeller, an electric circuit for the lamp, and a make-and-break mechanism associated with said electric circuit and with said propelling means to be actuated by the latter for interrupting said circuit at a frequency proportional to the speed of operation of said propelling means.

CARL J. CRANE.

REFERENCES CITED

The following references are of record in the file of this patent:

UNITED STATES PATENTS

| Number | Name | Date |
|---|---|---|
| 2,326,169 | Piquerez | Aug. 10, 1943 |
| 2,295,586 | Little | Sept. 15, 1942 |

FOREIGN PATENTS

| Number | Country | Date |
|---|---|---|
| 585,011 | Germany | Sept. 27, 1933 |